United States Patent [19]

Lender et al.

[11] 4,078,159
[45] Mar. 7, 1978

[54] MODIFIED DUOBINARY REPEATERED SPAN LINE

[75] Inventors: Adam Lender, Palo Alto; Henry H. Olszanski, Belmont, both of Calif.

[73] Assignee: GTE Automatic Electric Laboratories Incorporated, Northlake, Ill.

[21] Appl. No.: 733,596

[22] Filed: Oct. 18, 1976

[51] Int. Cl.$^2$ .......................... H04B 3/36; H04B 3/04
[52] U.S. Cl. .................... 178/68; 178/70 R; 179/15 AD; 179/16 EA; 325/13; 325/38 A; 325/41; 340/146.1 AB
[58] Field of Search .................. 178/70 R, 70 TS, 68; 179/15 AD, 16 E, 16 EA; 325/13, 38 A, 41, 42; 328/164; 340/146.1 AB

[56] References Cited

U.S. PATENT DOCUMENTS

| 2,996,578 | 8/1961 | Andrews, Jr. | 325/38 A |
| 3,303,284 | 2/1967 | Lender | 325/38 A |
| 3,337,864 | 8/1967 | Lender | 325/42 |
| 3,343,125 | 9/1967 | Lender | 340/146.1 AB |
| 3,434,059 | 3/1969 | Kesolits | 328/118 |
| 3,461,426 | 8/1969 | Lender | 325/42 |
| 3,798,544 | 3/1974 | Norman | 325/38 A |
| 3,838,214 | 9/1974 | Lind | 325/38 A |
| 3,876,944 | 4/1975 | Mack et al. | 325/38 A |
| 4,010,421 | 3/1977 | Lind | 178/68 |

Primary Examiner—Kathleen H. Claffy
Assistant Examiner—Randall P. Myers
Attorney, Agent, or Firm—Leonard R. Cool; Russell A. Cannon

[57] ABSTRACT

An end-office repeater accepts a high-speed bipolar signal, converts the bipolar signal into a unipolar signal, scrambles the unipolar signal, and encodes the scrambled unipolar signal into a modified duobinary signal for transmission over a cable pair. Before cable loss would severely degrade the duobinary signal, line repeaters and/or inter-office repeaters are installed at predetermined intervals so as to equalize and regenerate the modified duobinary signal. By so doing, the signal is recovered with acceptable phase jitter, which permits recovery of the original high-speed bipolar signal at the distant end of a repeatered span line. The receiving-end office repeater equalizes and regenerates the modified duobinary signal, decodes the signal to obtain a unipolar signal, descrambles the unipolar signal, and converts the unipolar signal into a bipolar signal.

Detection of errors in the modified duobinary signal may be obtained without adding redundant digits. However, errors which may occur during transmission may be lost by the decoding to a unipolar signal. Thus, errors detected from violations of the coding rule of the modified duobinary signal are inserted, by means of an error transfer network, into the bipolar signal and appear as violations of the bipolar code.

16 Claims, 10 Drawing Figures

MODIFIED DUOBINARY REPEATERED SPAN LINE

BACKGROUND OF THE INVENTION

1. Field of the Invention

This invention relates to the transmission of digital information over cable pairs in the telephone plant, and in particular to the repeatered line equipment required for the transmission of such information where modified duobinary encoding is employed.

2. Description of the Prior Art

Initially, correlative systems found use in data transmission systems. Most commonly, bit rates in the order of 2400 and 4800 bps were used, and transmission was either over metallic wire pairs or carrier derived voice channels. In such applications, regeneration of the correlative level-coded signal was not a basic requirement.

PCM systems, such as the Western Electric T1 type, have been employed in commercial telephone service since the early 1960's. Each such system provides 24 voice-grade telephone channels. The system bit rate is 1.544 Megabits per second (Mb/s). Primary use of such systems has been over cable pairs in the exchange plant. In transmitting a 1.544 Mb/s digital signal over cable pairs, the signal becomes so degraded that restoration is required at intervals of about 6,000 feet. Regenerative repeaters have been used, and such repeaters are exemplified for prior-art systems by U.S. Pat. No. 2,996,578.

In order to double the transmission capability of the cable pairs, prior-art systems, which have been recently developed, have multiplexed two 24-channel PCM systems for transmission over an exchange cable pair in one direction of transmission. The bit rate is then increased to 3.152 Mb/s, more than double the rate for two systems. This is required because of pulse stuffing, which is employed in the time-multiplexing process. in essence, the capacity of the system is doubled because 48, rather than 24, channels are available for transmission over the repeater span. Because of this, the bit rate over the line is also doubled. For this reason, such conventional 48-channel systems require a new repeater which will operate at the new bit rate and over the greater frequency band equal to twice that required for the T1-type lines. Further, these conventional systems suffer from the problems of substantial additional crosstalk coupling which increases with frequency at the rate of 4.5 dB/octave because of the requirement for higher frequency transmission. Because of this and other factors, the number of 48-channel systems that may be accommodated in a single cable depends upon the number of pairs in the cable and whether screened cable is employed. In certain applications, the use of two different cables, one for each direction of transmission, is the most desirable approach. Thus, such 48-channel conventional systems have limited applications, and in many instances cannot be used to retrofit existing 24-channel lines. In addition to the factors of crosstalk coupling loss, the cable loss is important with respect to the repeater spacing, i.e., the physical distance between successive tandem repeaters. The problems involved relate directly back to the higher bit rate employed for the transmission of the 48-channel PCM group. Engineering considerations for a 48-channel system, which employs a transmission frequency of about 3.152 MHz, are contained in the GTE LENKURT publication, Section 836-910-073, issue 1, November 1974, a copy of which is attached. The subject GTE LENKURT publication is incorporated herein by reference.

These problems were overcome by the present invention which provides for transmission of 48 voice-grade channels having an effective bit rate of 3.152 Mb/s, but only requires about the same bandwidth for transmission as is employed for a 24-channel system using a bipolar, PCM signal. Thus, the crosstalk noise problems at higher frequencies are minimized. Further, the invention provides a transmission technique which is a suitable 48-channel retrofit for the 24-channel lines.

SUMMARY OF THE INVENTION

Briefly, the invention relates to the transmission of digital information over a repeatered span line. A PCM signal in bipolar form is encoded into a modified duobinary signal prior to transmission. When required because of degradation experienced during transmission, the modified duobinary signal is regenerated at predetermined intervals, which are the same as for the T1 lines. At the receiving terminal, a regenerated modified duobinary signal is decoded to obtain the original PCM bipolar signal. Where errors occur during transmission, the errors are detected on the basis of decoding violations of the modified duobinary signal and, when such violations occur, they are transferred to the bipolar signal as violations of the rules for bipolar signals.

DESCRIPTION OF THE PREFERRED EMBODIMENT

Figure 1:
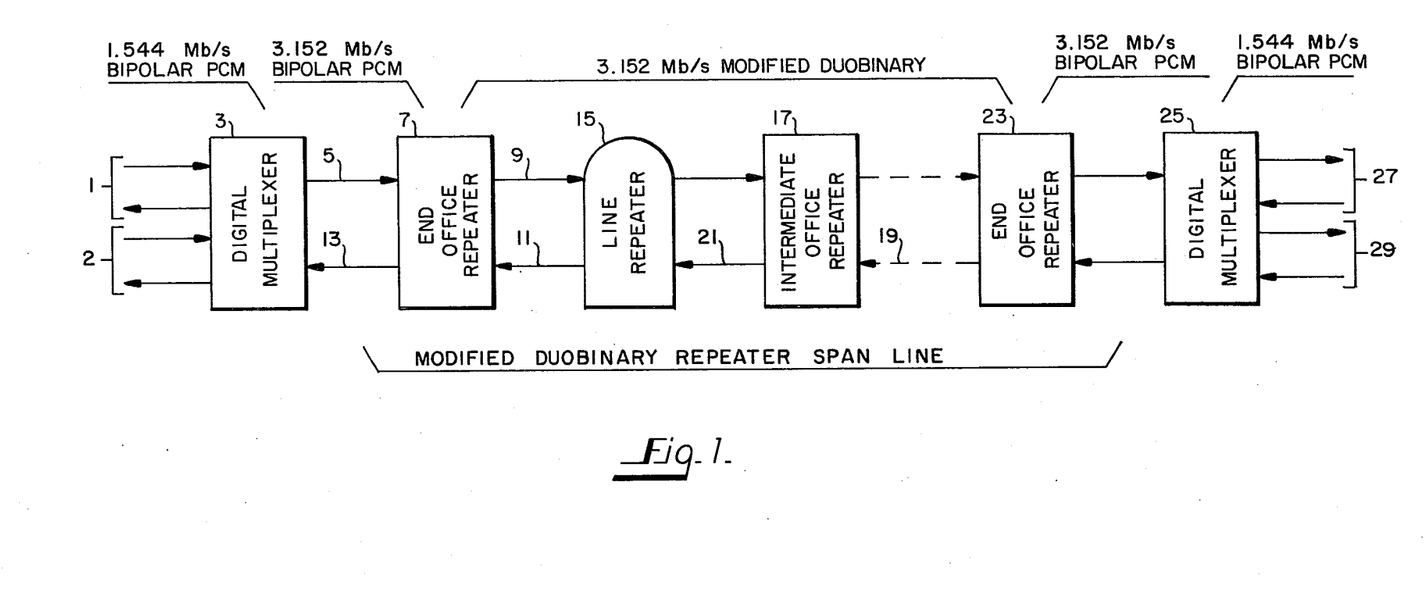
FIG. 1 is a simplified block diagram of a repeatered span line employed in conjunction with two multiplexed 24-channel PCM signals.

The preferred embodiment of the modified duobinary repeatered span line is shown in relation to a bipolar PCM transmission system having a binary rate of 3.152 Mb/s. It is to be understood that the invention as disclosed herein is not so limited and may be used in other arrangements without departing from the spirit and scope of the invention. Referring now to FIG. 1, it may be seen that the 3.152 Mb/s bipolar PCM signal enters the end-office repeater 7 via path 5. A similar PCM signal from the opposite terminal end leaves end-office repeater 7 via path 13. The manner in which the 3.152

Mb/s bipolar PCM signal is derived is not of particular importance to the invention. One technique shown is by means of a digital multiplexer 3 which converts two 24-voice grade channels, each having a 1.544 Mb/s rate, into a 3.152 Mb/s rate. Conversely, the digital multiplexer 3 converts the 3.152 Mb/s rate on path 13 into two 1.544 Mb/s PCM streams, each providing 24 voice grade channels.

The end-office repeater 7 provides the means for converting the bipolar PCM signal into a modified duobinary signal for transmission over the cable path 9 to repeaters such as line repeater 15 and intermediate office repeater 17, which are spaced at predetermined intervals between end-office repeaters 7 and 23. Repeaters such as line repeater 15 are located at positions which are not necessarily readily accessible — such as manholes, etc., which are remote from a telephone office. When the transmission path passes through a central office, an intermediate office repeater 17 may be employed. The broken line between intermediate office repeater 17 and end-office repeater 23 indicates that, where necessary, a plurality of line repeaters 15 and/or intermediate office repeaters 17 may be inserted, and such use depends upon the distance and locations available. The type of repeater selected and its location depends upon system engineering considerations, as are detailed in the GTE LENKURT publication, Section 836-910-073, incorporated by reference. End-office repeater 23 provides the same functions as that of end-office repeater 7. Likewise, the digital multiplexer 25 performs the same functions as digital multiplexer 3, thereby providing a means for conversion of the 1.544 Mb/s bipolar PCM streams into the 3.152 Mb/s PCM stream and vice versa. The elements which make up each of the repeaters of the modified duobinary repeatered span line will be discussed in more detail hereinbelow.

Figure 2A:
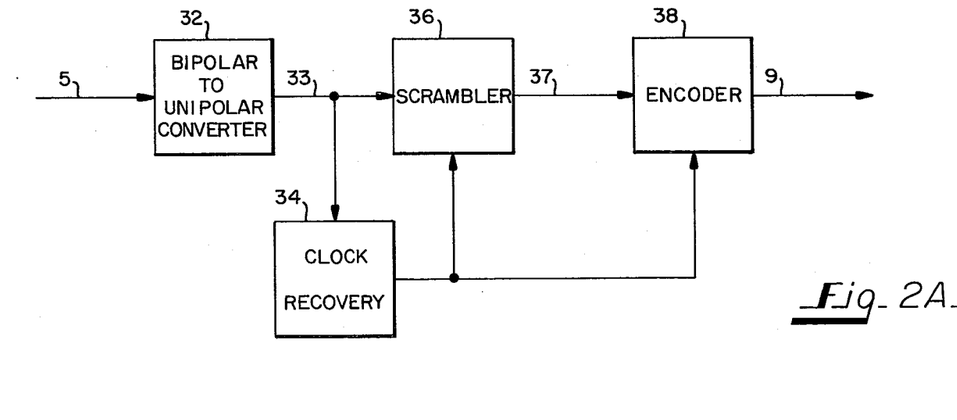
FIG. 2A is a block diagram of the transmitting portion of the end-office repeater as shown at 7 and 23 of FIG. 1.
Figure 6:
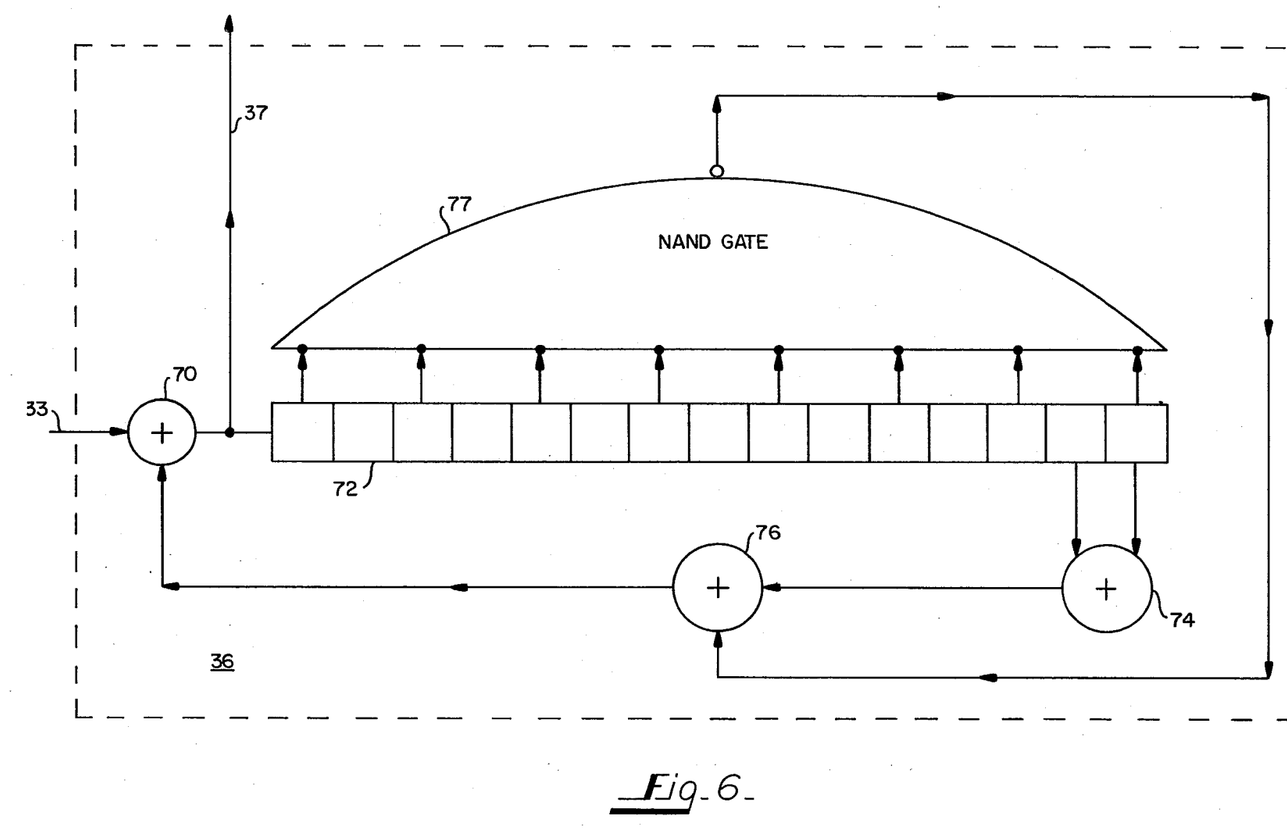
FIG. 6 is a block diagram of a scrambler which is employed in the end-office repeater.

Referring now to FIG. 2A, the transmitting section of the end-office repeater is illustrated. The incoming bipolar pulses on line 5 are converted to unipolar pulses in converter 32. Techniques for making such conversion are well known, and one technique for deriving the unipolar equivalent is by rectification of the bipolar signal. The converter converts a 3.0 volt peak bipolar 3.152 Mb/s signal having a 50% duty cycle to a return to zero 50% duty cycle unipolar signal. This is shown in waveforms A and B of FIG. 3. The unipolar output is applied via path 33 to clock recovery circuit 34 and to one input of scrambler 36. Techniques for recovering the timing information from an incoming digital pulse train are well known and are not discussed further herein. Because of the need to recover clock timing information at the remote repeaters and to minimize DC wander, the incoming bit stream is randomized in a self-synchronizing scrambler. Scramblers are also well known in the art. However, the preferred form of the scrambler employed in the instant invention is shown in block form in FIG. 6. Referring to FIG. 6, the unipolar input appears at path 33 and is applied to modulo-2 adder 70. A 15-stage shift register 72 is connected to the output of modulo-2 adder 70. Modulo-2 adders 74 and 76 are connected in a feedback path, and the output of adder 74 is applied as one input to adder 76, the other being NAND-gate 77, which monitors an all-zero or alternate-zero patterns. The output of adder 76 is applied as the second input to adder 70. The randomized output unipolar data appears at path 37. Referring again to FIG. 2A, encoder 38 converts the unipolar 50% duty cycle signal into a 100% duty cycle modified duobinary output signal shown in C of FIG. 2A. Techniques for converting binary signals into modified duobinary signals are well known. An analog method of encoding is given in U.S. Pat. No. 3,457,510, and a digital method of conversion is demonstrated in U.S. Pat. No. 3,993,953. Some conditioning of the signal is generally necessary, and a strap-type build-out network may be employed between the output of encoder 38 and the cable path 9.

Figure 2B:
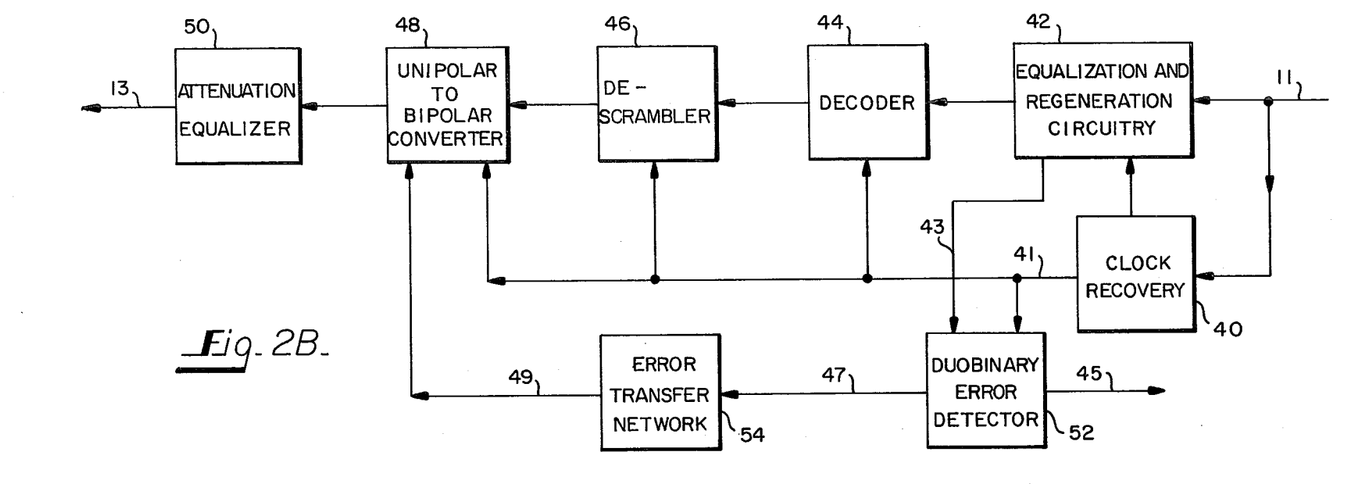
FIG. 2B is a block diagram of a receiving portion of the end-office repeater as shown at 7 and 23 of FIG. 1.

The receiver portion of the end-office repeater is shown in FIG. 2B. As with the transmitting section, a strappable line build-out network may be employed at the input to this section of the repeater. Such a build-out network is not shown since its characteristics and use are well known. The incoming line signals on path 11 are applied to equalization and regeneration circuitry 42 and to clock recovery 40. A clock recovery circuit similar to that in the transmitting section may be used. Such clock recovery circuits are well known. The equalization and regeneration circuitry will be described in more detail hereinbelow. Following equalization and regeneration, the signal is decoded in decoder 44, the output of which is a return-to-zero unipolar pulse train. This unipolar pulse train is descrambled in descrambler 46, which provides an inverse function to the scrambler 36 of the transmit section. Except for errors which may have occurred in transmission, the unipolar signal appearing at the output of descrambler 46 would be that of the transmitted signal output from the bipolar-to-unipolar converter 32 of the transmitting section. Such descramblers are well known in the art and will not be discussed further. The unipolar signal is converted to bipolar form in unipolar-to-bipolar converter 48. Such converters are well known and one such is illustrated in U.S. Pat. No. 2,700,696. For level control purposes, an attenuation equalizer 50 is connected to the output of converter 48 to control the amplitude applied to path 13. The timing for decoder 44, descrambler 46, and unipolar-to-bipolar converter 48 is obtained from clock recovery 40 on path 41. Note that a clock timing signal is also applied to equalization and regeneration circuitry 42, and from path 41 a clock timing signal is applied to duobinary error detector 52. In addition to the clock signal, the output in modified duobinary form of equalization and regeneration circuitry 42 is applied via path 43 to error detector 52. The operation of error detector 52 will be described in more detail hereinbelow. One output from the error detector 52 on path 45 provides for operation of office alarm equipment for the telephone central office. On the other hand, the output from the error detector 52 along path 47 is applied to an error transfer network 54 and from there along path 49 to the unipolar-to-bipolar converter 48. This is necessary since modified duobinary errors from the repeatered line are eliminated in the decoder when the signal is converted from a bipolar to a unipolar format. Thus, a detected error must be transferred via an error transfer network 54 to be inserted into the data stream as a bipolar violation. This is necessary in order that errors generated in the span line may be detected by the terminal equipment, which is designed to operate with a bipolar signal.

Figure 4:
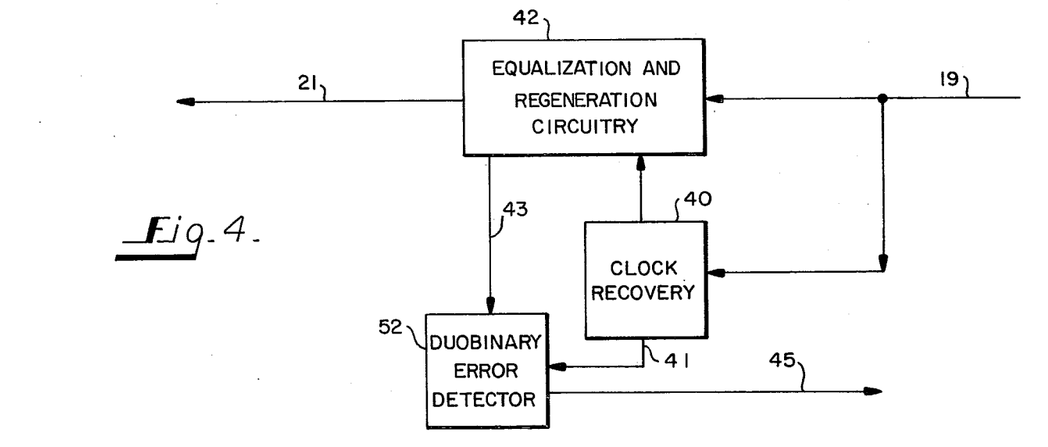
FIG. 4 is a block diagram which shows the basic regeneration circuitry and error detection such as is used in an inter-office repeater.

The equalization and regeneration circuitry and the error detection arrangement such as is used in the receiver of the end-office repeater are also employed in the intermediate office repeater as shown at FIG. 4. Note that the elements have been designated by the same numbers where they are representative of the same elements. For the intermediate office repeater, the duobinary error detector 52 merely provides the alarm information output since it is not desired or required to provide error transfer, as is required at the end-office repeater in order to correlate the transmission errors with bipolar violations. With respect to line repeater 15, the error detector is not employed, only these elements which are necessary for equalization and regeneration, such as 42 and clock recovery 40, are necessary and are a part of the repeater used at these locations.

Figures 5, 9:
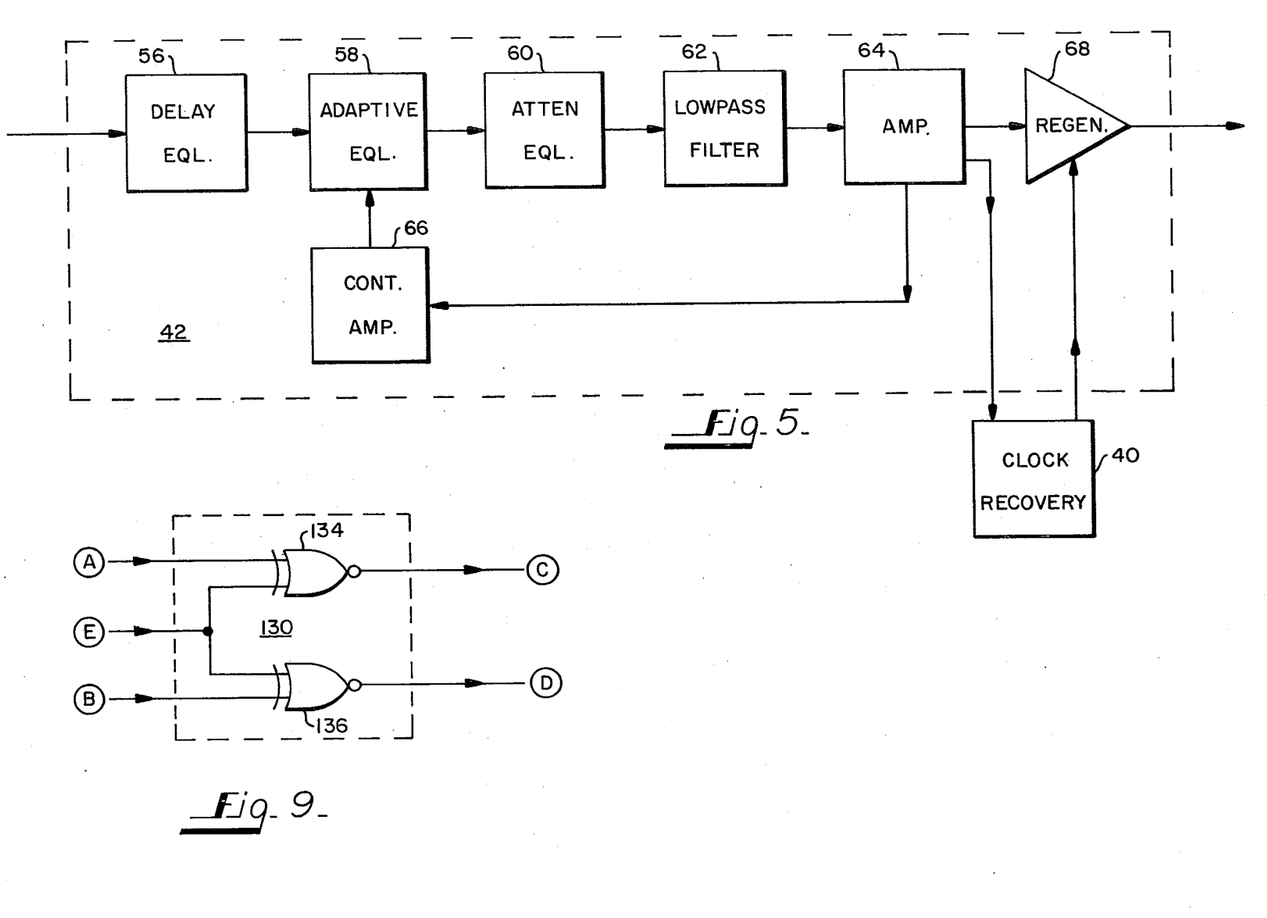
FIG. 5 is a more detailed block diagram of the equalization and regeneration circuitry as is employed at 42 in FIGS. 2B and 4.
FIG. 9 shows a circuit arrangement of an error transfer network.

Equalization and regeneration circuitry 42 is shown in more detail in FIG. 5. Further, the equalization and regeneration circuitry is disclosed more completely in the inventors' copending application, filed Oct. 18, 1976, Ser. No. 733,597. Referring now to FIG. 5, the incoming modified duobinary signal is applied first to a fixed delay equalizer 56, then to an adaptive equalizer 58, which equalizer automatically provides both phase and amplitude equalization. Control for the adaptive equalizer is provided from output amplifier 64 to control amplifier 66, which amplifier 66 converts the peak AC line signal into a representative direct-current signal for control of adaptive equalizer 58. The equalized signal is next applied to attenuation equalizer 60, and the frequency is sharply limited to 1.6 MHz in lowpass filter 62 prior to amplification in amplifier 64. The output of amplifier 64 is applied both to clock recovery 40 and regenerator 68 to obtain a retimed square-wave modified duobinary output signal at the output of regenerator 68. Both the clock recovery 40 and regenerator 68 are described in more detail in our referenced copending application.

Figure 3:
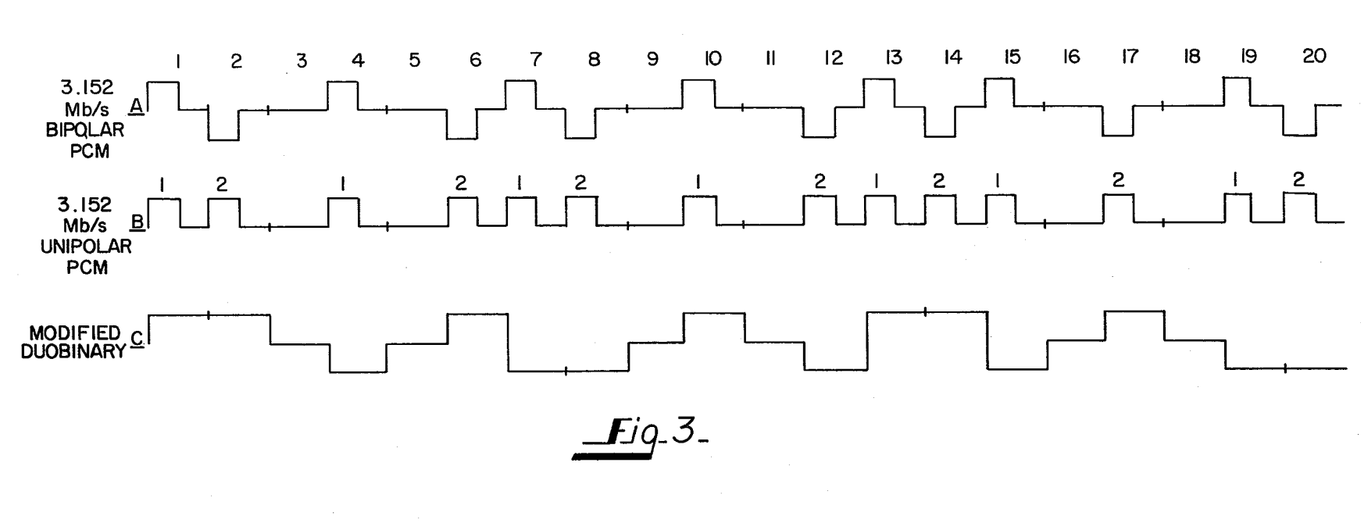
FIG. 3 is a waveform diagram and shows a typical bipolar PCM pattern at A, the unipolar equivalent at B, and the encoded modified duobinary result at C.
Figure 7:
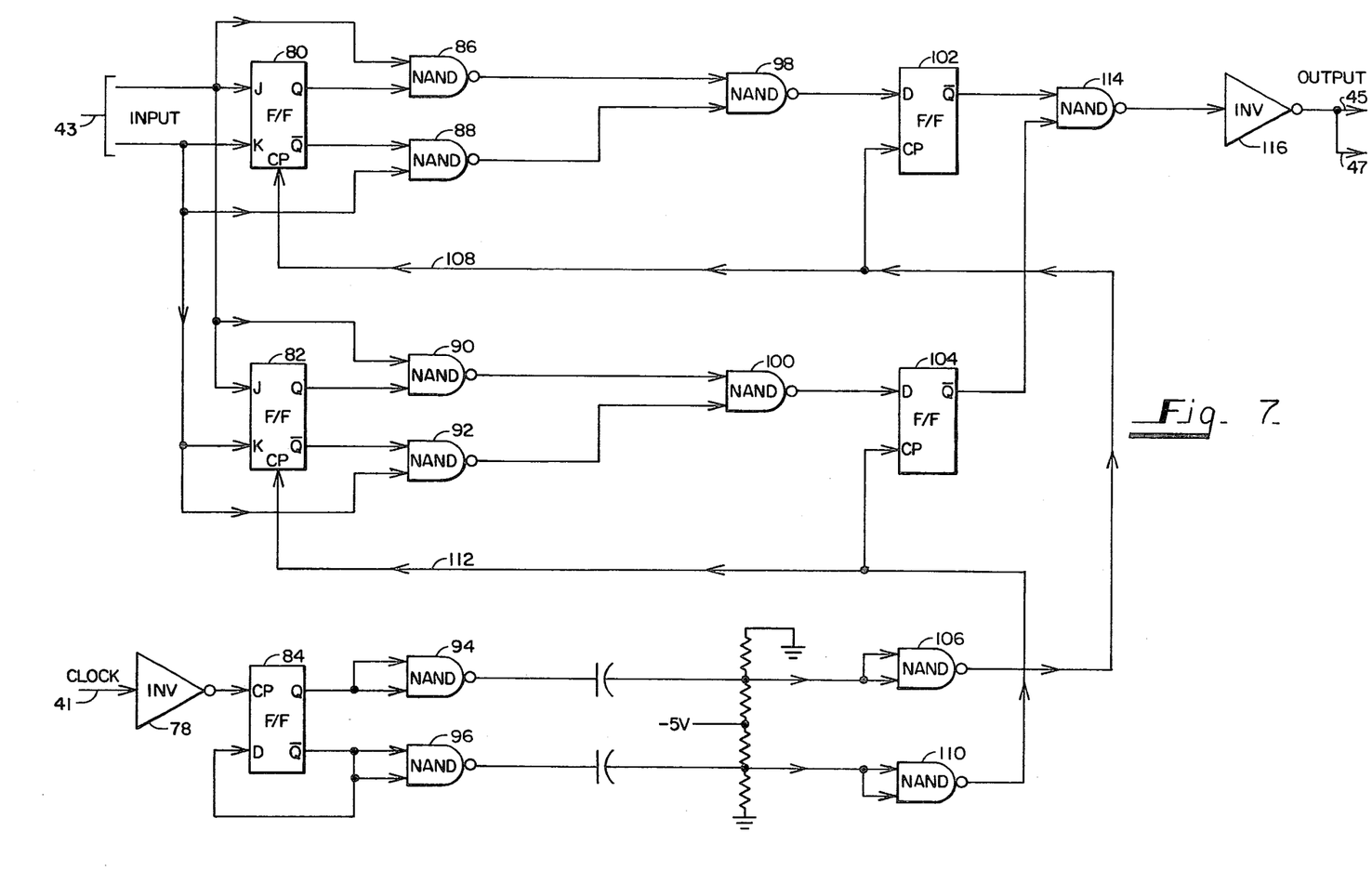
FIG. 7 is a block diagram of an error detector such as may be employed at 52 in FIGS. 2B and 4.

A modified duobinary error detector which is responsive only to a modified duobinary input signal is shown in FIG. 7. This error detector is described in more detail in copending application Ser. No. 742,168, filed Nov. 15, 1976. Referring now to FIG. 7, the clock input on lead 41 is inverted in inverter 78 and essentially divided by flip-flop 84. NAND-gate pair 94 and 106, in conjunction with the reference voltage connected therebetween, provides an output pulse on path 108 to provide clock timing to flip-flops 80 and 102. NAND-gate pair 96 and 110, in conjunction with the subject reference voltage, provides a clock pulse output on path 112 to flip-flops 82 and 104. The modified duobinary input is applied on input 43, and it should be noted that the modified duobinary signal must be arranged so as to provide positive input pulses on the paths J and/or K, as determined by the state of the modified duobinary signal. For example, if positive-going pulses are presumed to be applied as a positive input to the J-terminal of flip-flops 80 and 82, then the negative-going pulse, such as is shown in waveform C of FIG. 3, is inverted and applied as a positive-going input to the K-inputs of flip-flops 80 and 82. A positive-going modified duobinary signal, therefore, will provide 1 and 0 inputs to the J- and K-inputs, respectively, of flip-flops 80 and 82. A 0-level input will put 0 inputs to J- and K-inputs, and a negative-going modified duobinary input signal will apply 1 and 0 inputs to the K- and J-inputs, respectively. While the incoming modified duobinary signal is simultaneously applied to flip-flops 80 and 82, it is to be noted that, because of the timing obtained from the timing circuitry, these flip-flops operate alternately on the applied input signal. Since both operate similarly, only the one shown at the upper portion on the drawing will be described in detail, it being understood that the other circuit operates similarly. NAND-gate 86 has inputs from the J-input of flip-flop 80 and from the Q-output of flip-flop 80. NAND-gate 88 has inputs from the K-input of flip-flop 80 and from the $\overline{Q}$-output of flip-flop 80. NAND-gate 98 accepts the outputs from NAND-gates 86 and 88 and applies its output to the D-input of flip-flop 102. The Q-output is applied to one input of NAND-gate 114, and the other input to this NAND-gate is from flip-flop 104, the companion to 102 in the lower circuit. The output of NAND-gate 114 is inverted in inverter 116 and is applied, as necessary, to error alarm circuitry and also to an error transfer network.

The purpose of the error transfer network is to monitor duobinary errors and transfer these errors to the bipolar signal. Duobinary errors are detected only during the presence of extreme levels, that is +1 or −1 (positive or negative pulse). These errors are detected, and their time location is not known. Any time an error is detected in the modified duobinary signal, the pulse +1 or −1, indicating binary "1", is transferred to the bipolar pulse train. However, for this case, the polarity of the pulse is exactly the same as that of the previous pulse, resulting in a bipolar violation. Thus, the detected error in duobinary is transferred to the bipolar pulse train and eventually detected by a bipolar error detector.

Figure 8:
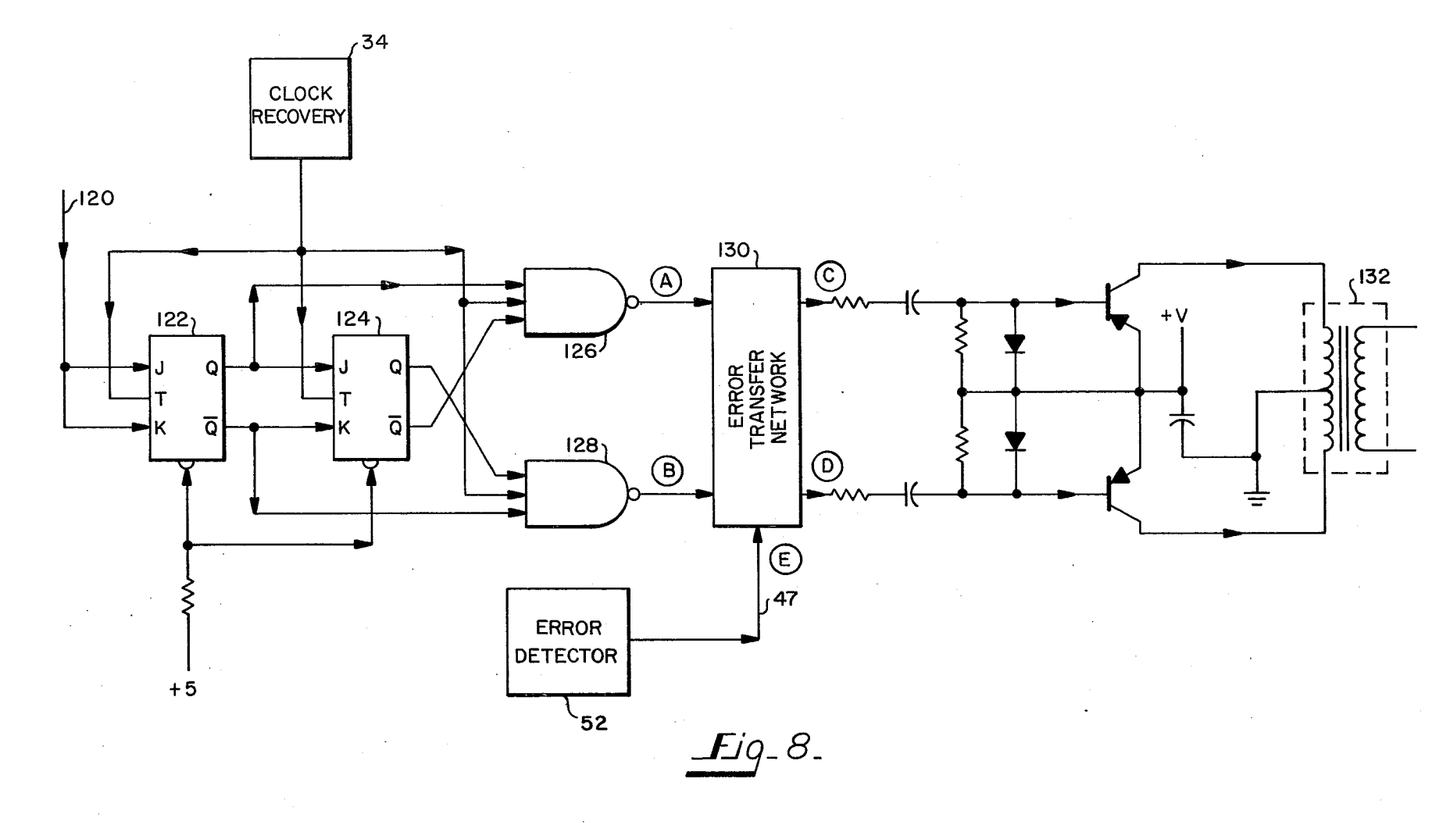
FIG. 8 is a block diagram of a unipolar-to-bipolar converter with an error transfer network.

The Error Transfer Network 130, as shown in FIG. 8 and in more detail in FIG. 9, operates in conjunction with a Unipolar-to-Bipolar Converter and a Duobinary Error Detector 52. In FIG. 8, the ETN (Error Transfer Network) 130 has three inputs A, B, and E and two outputs C and D, and is interposed in the bipolar converter. The unipolar-to-bipolar converter, excluding ETN, has a configuration similar to the unipolar-to-duobinary converter described in U.S. Pat. No. 3,993,953. A principal difference is that the NAND-gates in FIG. 8 are preceded by two flip-flops 122 and 124 rather than four. A further difference is that the NAND-gates 126 and 128 have also a square-wave clock input from clock recovery 34. Flip-flop 122 operates as a digital differentiator; that is, whenever the input is a binary "1", 122 changes state; otherwise there is no change. Flip-flop 124 serves as a one-unit delay. In conjunction with NAND-gates 126 and 128, the binary pulse train at the input to flip-flop 124 is delayed by one bit interval, and the delayed pulse train is subtracted from the undelayed one, thus producing a 3-state bipolar signal having one-to-one correspondence to the binary input. At A or B in FIG. 8, either no pulse appears, corresponding to binary "0", or a negative pulse corresponding to binary "1". The negative pulse or no pulse on A or B represents also the bipolar pulse train. No pulse is bipolar zero; negative pulse on A represents, for example, positive or +1 bipolar pulse. Similarly, a negative pulse on B represents a negative or −1 bipolar pulse. This convention, of course, can be reversed. What is important is that the negative pulse cannot possibly occur simultaneously on A and B. Further, in accordance with the bipolar rules, negative pulses on A or B will always alternate, provided there is no error resulting in violation of this pattern. In the absence of ETN 130 in FIG. 8, C is identical to A, and D is identical to B. The function of ETN 130 is to introduce violation of the bipolar pattern when E indicates an error. Remembering that E indicates an error only when binary "1" is present (top or bottom level), this binary "1" will result in a negative pulse on A or B. Here, any circuit delays are disregarded for simplicity. Such delays can be easily compensated for and are not discussed, since these delay computations are well known. When E is a negative pulse, it indicates an error, and at the same time, either A or B has a negative pulse. If this pulse is on A, it will be transferred by ETN 130 to D; if it is on B, it will be transferred to C. Thus, in either case, a bipolar violation is introduced resulting in an error which will be detected by a bipolar error detector. The net result of this violation is to have two successive bipolar pulses of the same polarity at the output of transformer 132.

The clock 34 input to NAND gates 126 and 128 is necessary to assure that bipolar pulses at A and B have 50% duty cycle. Since the clock is a square wave at the bit rate, this assures that the 50% duty cycle output occurs on the negative half-portion of the square wave representing the clock. The bipolar outputs with 50% duty cycle at A and B are just gated in the same form by ETN 130 to C and D; when no error E is present, A is transferred to C and B to D. In case of error on E, A is transferred to D and B to C. The details of the ETN are shown in FIG. 9. Two EX-OR gates 134 and 136 are the heart of ETN 130. Here, A, B, and E, as well as the Exclusive-OR gates 134 and 136, operate on negative logic. When A, B, C, or D is negative, it indicates binary "1" or a bipolar pulse which is +1 or −1. A zero on A, B, C, or D indicates binary "0". Similarly, when E is a negative pulse, it indicates an error, and at the same time always either A or B must be negative, since errors are detected only when binary "1" is present. A zero on E indicates no error. An EX-OR gate by definition has an output (negative pulse) only when the two inputs are different; that is one is negative and the other zero. Whenever E is zero and A is also zero, then C is zero; thus, A was transferred to C. Similarly for B transfer to D by symmetry. When E is zero and A is negative, C is also negative, and by symmetry a similar situation applies to B. Any time E is negative (indication of error), either A or B must be negative. If A is negative, then C is zero, but D is negative. Thus, A is transferred to D, indicating bipolar violation. If both E and B are negative, B is transferred to C by symmetry. Thus, ETN 130 in FIG. 9 transfers the duobinary error to the bipolar pulse train.

Although the invention has been particularly shown and described with reference to a preferred embodiment thereof, it will be understood by those skilled in the art that change in form and detail may be made therein without departing from the spirit and scope of the invention.

What is claimed is:

1. A modified duobinary repeatered transmission system which comprises:
    means for changing a high-speed bipolar bit stream into a modified duobinary bit stream for transmission comprising:
       means for converting said high-speed bipolar bit stream into a unipolar bit stream;
       means for scrambling said unipolar bit stream; and means for encoding said scrambled unipolar bit stream to obtain a modified duobinary bit stream; and
    means for recovering said high-speed bipolar bit stream from said transmitted modified duobinary bit stream at a receiving location comprising:
       means for equalizing the incoming modified duobinary bit stream;
       means for generating a clock signal from the incoming bit stream;
       means responsive to the output of said equalizing means and to said clock signal for regenerating said modified duobinary bit stream;
       means responsive to said regenerated bit stream and said clock signal to decode said bit stream and obtain a unipolar bit stream;
       means for descrambling said unipolar bit stream, said descrambling means having an input connected to receive said decoded unipolar bit stream and an input connected to receive said clock signal; and
       means for converting said unipolar bit stream into a bipolar bit stream.

2. A modified duobinary repeatered transmission system in accordance with claim 1 wherein said means for recovering further comprises:
    means responsive to said regenerated bit stream and to said clock signal for detecting violations of the modified duobinary coding rules; and
    error transfer means having an input connected to an output of said modified duobinary violation-detecting means and having an output connected to an input of said converting means whereby errors in the modified duobinary bit stream are transferred into the recovered bipolar bit stream as violations of the bipolar signal.

3. A modified duobinary repeatered transmission system in accordance with claim 1 wherein said converting means for converting a unipolar bit stream to a bipolar bit stream further comprises:
    a clock means having an output;
    a modified duobinary error detector means having an output;
    a first flip-flop having inputs connected to receive the unipolar bit stream, and input connected to receive timing information from said clock means; said first flip-flop providing Q and $\overline{Q}$ outputs;
    a second flip-flop haivng one input connected to the Q-output of said first flip-flop, a second input connected to the $\overline{Q}$-output of said first flip-flop, and a third input connected to the output of said clock means; said second flip-flop providing Q- and $\overline{Q}$- outputs;
    a first NAND-gate having an output and having a first input from one output of said first flip-flop, a second input from one output of said second flip-flop, and a third input connected to the output of said clock means;
    a second NAND-gate having an output and having a first input connected to the other output of said first flip-flop, a second input connected to the other output of said second flip-flop, and a third input connected to the output of said clock means;
    an error transfer network having two outputs and having a first input connected to the output of said first NAND-gate, a second input connected to the output of said second NAND-gate, and a third input connected to the output of said error detector means, said network providing a pulse on one output or the other output in accordance with the presence of the unipolar input pulses and the presence of the error pulses from said error detection means; and
    means for developing an output signal wherein pulses on one said output of said network will be of one polarity and pulses on the other said output of said network will be of the other polarity.

4. A modified duobinary repeatered transmission system in accordance with claim 3 wherein said error transfer network further comprises:
   a first Exclusive-OR gate having an output and having a first input connected to the output of said first NAND-gate, and a second input connected to the output of said modified duobinary error detection means; and
   a second Exclusive-OR gate having an output and having a first input connected to the output of said second NAND-gate and having a second input connected to the output of said modified duobinary error detection means.

5. A modified duobinary repeatered transmission system which comprises:
   means at a transmitting location for changing a high-speed bipolar bit stream into a modified duobinary bit stream for transmission comprising:
     means for converting said high-speed bipolar bit stream into a unipolar bit stream;
     means connected to receive said unipolar bit stream from said converter for scrambling said unipolar bit stream and providing a scrambled unipolar bit stream at an output.
     and means, having an input connected to the output of said scrambling means, for encoding said scrambled unipolar bit stream to obtain a modified duobinary bit stream for transmission;
   means at a selected intermediate location for equalizing and regenerating said modified duobinary bit stream; and
   means for recovering said high-speed bipolar bit stream from said transmitted modified duobinary bit stream at a receiving location comprising:
     means for equalizing, having an input connected to receive said modified duobinary signal, said equalizing means providing an equalized modified duobinary bit stream at an output;
     means for generating a clock signal from the incoming bit stream;
     means responsive to the output of said equalizing means and to said clock signal for regenerating said modified duobinary bit stream;
     decoding means having a first input operatively connected to said regenerated bit stream and a second input operatively connected to said clock signal, said decoding means responsive to the regenerated bit stream and the clock signal to decode said bit stream and to obtain a unipolar bit stream at an output;
     descrambling means having a first input connected to the output of said decoding means, having a second input connected to receive said clock signal and providing a descrambled unipolar signal at an output; and
     converting means having an input connected to the output of said descrambling means, said means converting the unipolar bit stream into a bipolar bit stream.

6. A modified duobinary repeatered transmission system in accordance with claim 5 wherein said means, at a selected intermediate location, further comprises:
   equalizing means having an input connected to receive the incoming modified duobinary bit stream, said equalizing means providing an equalized modified duobinary bit stream at an output;
   means for generating a clock signal from the incoming bit stream; and
   means responsive to the output of said equalizing means and to said clock signal for regenerating said modified duobinary bit stream.

7. A modified duobinary repeatered transmission system in accordance with claim 5 wherein said means, at a selected intermediate location, further comprises:
   means responsive to said regenerated bit stream and to said clock signal for detecting violations of the modified duobinary coding rules.

8. A modified duobinary repeatered transmission system in accordance with claim 5 wherein said means for recovering further comprises:
   means responsive to said regenerated bit stream and to said clock signal for detecting violations of the modified duobinary coding rules; and
   error transfer means having an input connected to an output of said modified duobinary detecting means and having an output connected to an input of said converting means whereby errors in the modified duobinary bit stream are transferred into the recovered bipolar bit stream as violations of the bipolar signal.

9. A modified duobinary repeatered transmission system in accordance with claim 5 wherein said converting means for converting a unipolar bit stream to a bipolar bit stream further comprises:
   a clock means having an output;
   a modified duobinary error detector means having an output;
   a first flip-flop having inputs connected to receive the unipolar bit stream, an input connected to receive timing information from said clock means; said first flip-flop providing Q- and $\bar{Q}$-outputs;
   a second flip-flop having one input connected to the Q-output of said first flip-flop, a second input connected to the $\bar{Q}$-output of said first flip-flop, and a third input connected to the output of said clock means; said second flip-flop providing Q- and $\bar{Q}$-outputs;
   a first NAND-gate having an output and having a first input from one output of said first flip-flop, a second input from one output of said second flip-flop and a third input connected to the output of said clock means;
   a second NAND-gate having an output and having a first input connected to the other output of said first flip-flop, a second input connected to the other output of said second flip-flop, and a third input connected to the output of said clock means;
   an error transfer network having two outputs and having a first input connected to the output of said first NAND-gate, a second input connected to the output of said second NAND-gate, and a third input connected to the output of said error detector means, said network providing a pulse on one output or the other output in accordance with the presence of the unipolar input pulses and the presence of the error pulses from said error detection means; and
   means for developing an output signal wherein pulses on one said output of said network will be of one polarity and pulses on the other said output of said network will be of the other polarity.

10. A modified duobinary repeatered transmission system in accordance with claim 9 wherein said error transfer network further comprises:

a first Exclusive-OR gate having an output and having a first input connected to the output of said first NAND-gate, and a second input connected to the output of said modified duobinary error detection means; and a second Exclusive-OR gate having an output and having a first input connected to the output of said second NAND-gate and having a second input connected to the output of said modified duobinary error detection means.

11. A modified duobinary repeatered transmission system which comprises:

means at a transmitting location for changing a high-speed unipolar bit stream into a modified duobinary bit stream for transmission comprising:
means for scrambling said unipolar bit stream;
and means for encoding said scrambled unipolar bit stream to obtain a modified duobinary bit stream;

means at a selected intermediate location for equalizing and regenerating said modified duobinary bit stream; and means for recovering said high-speed unipolar bit stream from said transmitted modified duobinary bit stream, at a receiving location, comprising:
means for equalizing the incoming modified duobinary bit stream;
means for generating a clock signal from the incoming bit stream;
means responsive to the output of said equalizing means and to said clock signal for regenerating said modified duobinary bit stream;
means responsive to said regenerated bit stream and said clock signal to decode said bit stream and obtain a unipolar bit stream; and
means for descrambling said unipolar bit stream, said descrambling means having an input connected to receive said decoded unipolar bit stream and an input connected to receive said clock signal, said descrambling means providing a descrambled unipolar signal at an output.

12. A modified duobinary repeatered transmission system in accordance with claim 11 wherein said means, at a selected intermediate location, further comprises:
equalizing means having an input connected to receive the incoming modified duobinary bit stream, said equalizing means providing an equalized modified duobinary bit stream at an output;
means for generating a clock signal from the incoming bit stream; and
means responsive to the output of said equalizing means and to said clock signal for regenerating said modified duobinary bit stream.

13. A modified duobinary repeatered transmission system in accordance with claim 12 wherein said means, at a selected intermediate location, further comprises:
means responsive to said regenerated bit stream and to said clock signal for detecting violations of the modified duobinary coding rules.

14. In a pulse transmission system wherein a high-speed bipolar bit stream is converted, at a transmitting terminal, into a modified duobinary bit stream for transmission, and at a receiving terminal the modified duobinary bit stream is decoded to obtain a unipolar bit stream as an intermediate step in converting the modified duobinary bit stream into a high-speed bipolar bit stream, apparatus for converting errors, which appear in the modified duobinary bit stream, into bipolar violations in the converted high-speed bipolar bit stream which comprises:

means for detecting errors in the modified duobinary bit stream, said detecting means having an output;
means for converting said unipolar bit stream into a high-speed bipolar bit stream having an input connected to receive said unipolar bit stream and providing a high-speed bipolar output bit stream; and
an error transfer network having as one input the high-speed bipolar output bit stream, having as a second input the output of said error detecting means, for combining the output of the modified duobinary error detecting means with the high-speed bipolar bit stream, whereby a high-speed bipolar bit stream is obtained which includes as bipolar violations errors introduced during transmission.

15. Apparatus in accordance with claim 14 further comprises:
means for generating a clock signal from the incoming modified duobinary bit stream;
means responsive to said modified duobinary bit stream and said clock signal to decode said bit stream and obtain a unipolar bit stream;
said means for converting comprising
a first flip-flop having inputs connected to receive the unipolar bit stream, an input connected to receive timing information from said clock means; said first flip-flop providing Q and $\overline{Q}$ outputs;
a second flip-flop having one input connected to the Q-output of said first flip-flop, a second input connected to the $\overline{Q}$-output of said first flip-flop, and a third input connected to the output of said clock means; said second flip-flop providing Q- and $\overline{Q}$- outputs;
a first NAND-gate having an output and having a first input from one output of said first flip-flop, a second input from one output of said second flip-flop, and a third input connected to the output of said clock means; and
a second NAND-gate having an output and having a first input connected to the other output of said first flip-flop, a second input connected to the other output of said second flip-flop, and a third input connected to the output of said clock means;
said error transfer network having two outputs and having a first input connected to the output of said first NAND-gate, a second input connected to the output of said second NAND-gate, and a third input connected to the output of said error detector means, said network providing a pulse on one output or the other output in accordance with the presence of the unipolar input pulses and the presence of the error pulses from said error detection means; and
means for developing an output signal wherein pulses on one said output of said network will be of one polarity and pulses on the other said output of said network will be of the other polarity.

16. Apparatus in accordance with claim 15 wherein said error transfer network further comprises:
a first Exclusive-OR gate having an output and having a first input connected to the output of said first NAND-gate, and a second input connected to the output of said modified duobinary error detection means; and
a second Exclusive-OR gate having an output and having a first input connected to the output of said second NAND-gate and having a second input connected to the output of said modified duobinary error detection means.

* * * * *